United States Patent [19]

Murphy

[11] 4,335,765
[45] Jun. 22, 1982

[54] PORTABLE MULTI-PURPOSE CONSTRUCTION TABLE

[76] Inventor: Rholand D. Murphy, Murphy La., Moab, Utah 84532

[21] Appl. No.: 96,962

[22] Filed: Nov. 23, 1979

[51] Int. Cl.³ .............................................. B27C 9/00
[52] U.S. Cl. ................... 144/286 R; 83/574; 108/92; 248/296; 269/296
[58] Field of Search ............. 144/1 R, 1 A, 1 B, 1 G, 144/1 H, 35 R, 35 A, 286 R, 286 A; 108/28, 33, 38, 39, 92, 97, 101; 269/296; 248/676; 83/574

[56] References Cited

U.S. PATENT DOCUMENTS

| | | | |
|---|---|---|---|
| 1,269,288 | 6/1918 | Landoll | 144/1 B |
| 1,496,982 | 6/1924 | Dunham | 144/1 B |
| 1,662,608 | 3/1928 | Hill | 144/1 B |
| 2,501,134 | 3/1950 | Meckoski et al. | 144/35 R |
| 2,599,096 | 6/1952 | Dirksen | 144/1 R |
| 2,656,861 | 10/1953 | Verret | 144/1B |
| 2,743,747 | 5/1956 | Franks | 144/1 G |
| 3,734,151 | 5/1973 | Skripsky | 144/1 R |
| 4,105,055 | 8/1978 | Brenta | 83/574 |
| 4,114,665 | 9/1978 | Decker | 144/286 R |
| 4,186,784 | 2/1980 | Stone | 108/28 |

Primary Examiner—W. D. Bray
Attorney, Agent, or Firm—Lynn G. Foster

[57] ABSTRACT

A one-man portable multi-purpose construction table comprising an elevated frame supported on floor engaging legs. Three horizontal platform sites or table areas at staggered elevations accommodate central mounting of a lower miter saw having a workpiece receiving surface which is horizontally aligned with the other two higher platform sites for workpiece stability. Each of the higher platform sites comprise a hinged plate for releasably mounting a portable power router, a portable power saw or the like at the underside of the plate. A circuit and exposed switches are used to cause electrical power to be selectively delivered to any desired tool receiving site.

5 Claims, 9 Drawing Figures

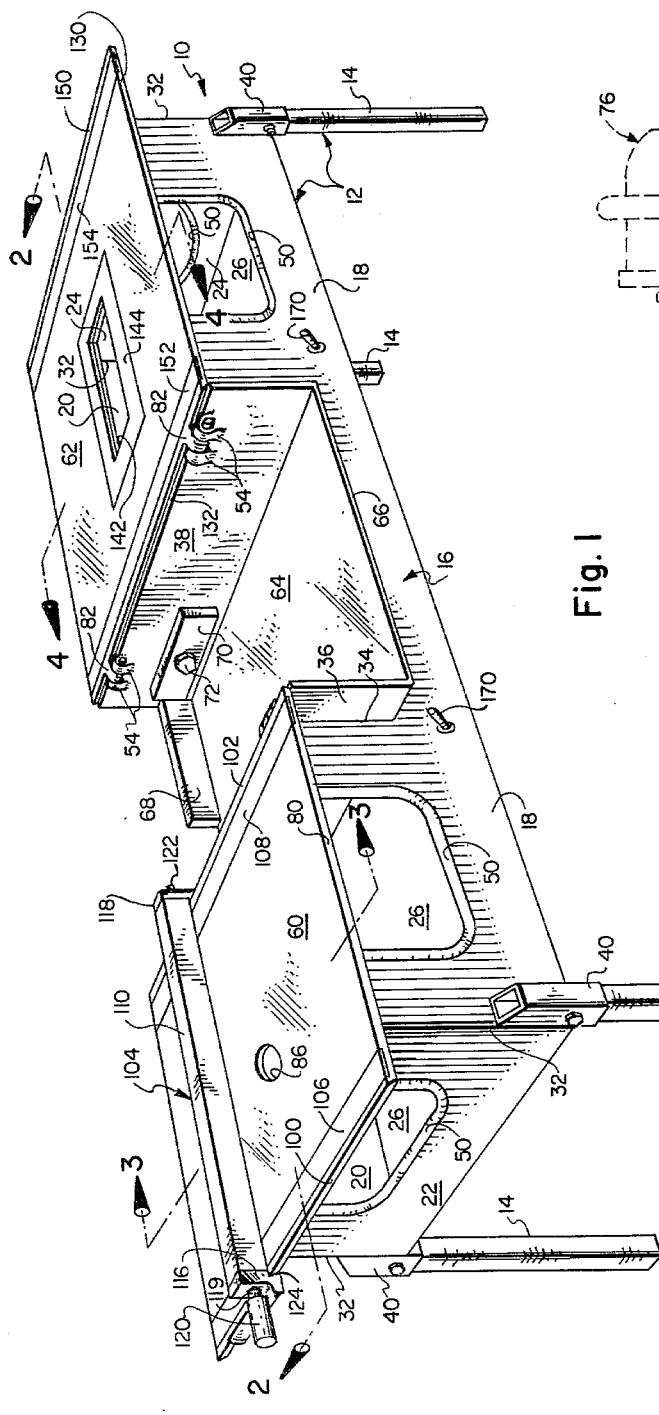

PORTABLE MULTI-PURPOSE CONSTRUCTION TABLE

BACKGROUND

1. Field of the Invention

The present invention relates generally to construction tables and more particularly to portable multi-purpose construction tables.

2. Prior Art

It is common practice in construction, particularly in carpentry, to use a plurality of separate power tools, e.g. a portable hand held power router, a portable hand held power saw, a waist high table saw and an elevated miter saw. The required capital investment for the mentioned separate tools is substantial. Transportation between construction job sites is cumbersome and usually requires at least two men. Also, relocation of the table saw and the miter saw from place to place at any construction site is very difficult if not impossible for one person to achieve.

In addition to the foregoing, it has become common practice to provide a desk or counter-top frame for receiving at the top upper flat surface thereof a single power tool in a releasable fashion. Such are unstable unless bolted down, are awkward to use and several tables are required if it is desired to use several portable power tools in fixed relation with a table.

BRIEF SUMMARY AND OBJECTS OF THE INVENTION

In brief summary, the present invention overcomes the above-identified problems and provides fundamentally a portable multi-purpose construction table which can be manually moved from place to place by one man and which comprises a frame having an elevated upper frame body and floor engaging legs whereby stepped horizontal platform or table areas are presented. At least one power tool receiving site is provided at one of the platform areas together with adjustable tool securing fasteners by which a power tool is removably secured at the site.

In its presently preferred form three power tool receiving sites are carried by the frame body. One site is centrally located at an exposed lower elevation and flanked on either side by the other two higher tool receiving sites. The central site is adapted to receive a miter saw, for example, so that the workpiece receiving table of the radial saw is disposed in a plane common to the plane containing the two opposed higher outside tool receiving sites. Thus, with no tools exposed at the two higher sites, the workpiece being operated upon by the radial saw may extend and be contiguously supported upon the exposed horizontal surface of said two sites. Each of the two elevated sites comprise a plate which is hinge connected along one edge to the frame body which accommodates upward pivoting to expose adjustable tool fastening structure carried at the underside of the plate. An aperture accommodates projection of the workpiece cutting instrument of the portable power tool the base of which is horizontally secured to the underside of the pivotable plate. An electrical circuit comprising one or more switches is used to cause electrical power to be selectively delivered to any desired tool receiving site.

With the foregoing in mind, it is a primary object of the present invention to provide a novel portable multi-purpose construction table.

A further paramount object of the present invention is the provision of a novel portable multi-purpose construction table which can readily be moved from place to place by one man.

A further important object of the present invention is the provision of a portable multi-purpose construction table which removably receives a plurality of power tools, thereby reducing the number of power tools required for the full spectrum of carpentry work.

These and other objects and features of the present invention will be apparent from the detailed description taken with reference to the accompanying drawings.

BRIEF DESCRIPTION OF THE DRAWINGS

FIG. 1 is a perspective representation of a presently preferred portable multi-purpose construction table according to the present invention;

FIG. 2 is a longitudinal cross section of the table of FIG. 1 taken along line 2—2;

DETAILED DESCRIPTION OF THE ILLUSTRATED EMBODIMENTS

Reference is now made to the drawings wherein like numerals are used to designate like parts throughout and which illustrate a presently preferred portable multi-purpose construction table, generally designated 10, according to the present invention. The table 10 may be formed of any suitable material such as metal, plastic, wood or the like, the illustrated embodiment being shown as having been fabricated from sheet metal, such as light weight aluminum. Thus, with all power tools removed, one man may readily move table 10 from place to place at any desired construction site or from construction site to construction site with or without disassembly. As hereinafter more fully described, table 10 is assembled in such a fashion that certain parts may be removed for transportation and storage purposes, if desired. Furthermore, table 10 accommodates achievement of the normal tasks required of a person doing the full spectrum of carpentry work with less than the normal array of power tools.

Table 10 comprises a frame, generally designated 12. Frame 12 comprises four floor engaging legs 14 of metal tubing having a hollow square or rectangular cross sectional configuration. It is ordinarily preferred that the legs 14 be of such a length that the frame body 16 is disposed more or less waist high for the user.

Figure 3:
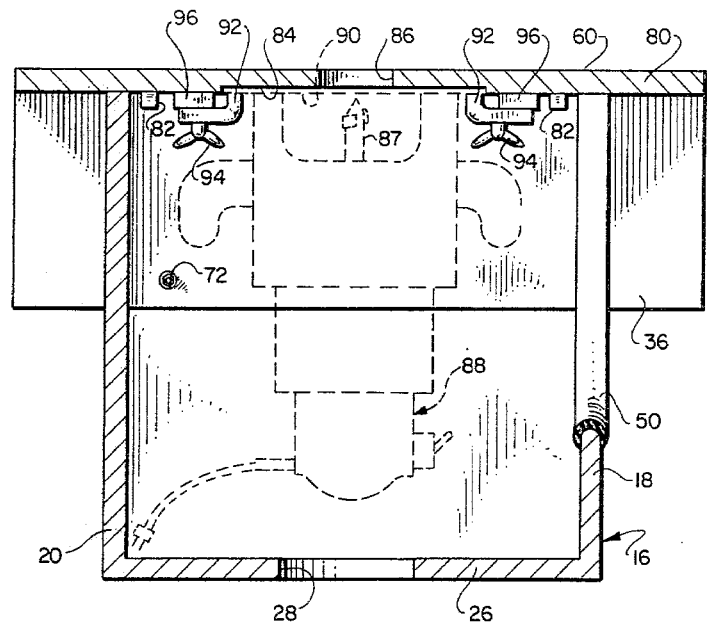
FIG. 3 is a transverse cross section through the table of FIG. 1 along line 3—3.
Figure 4:
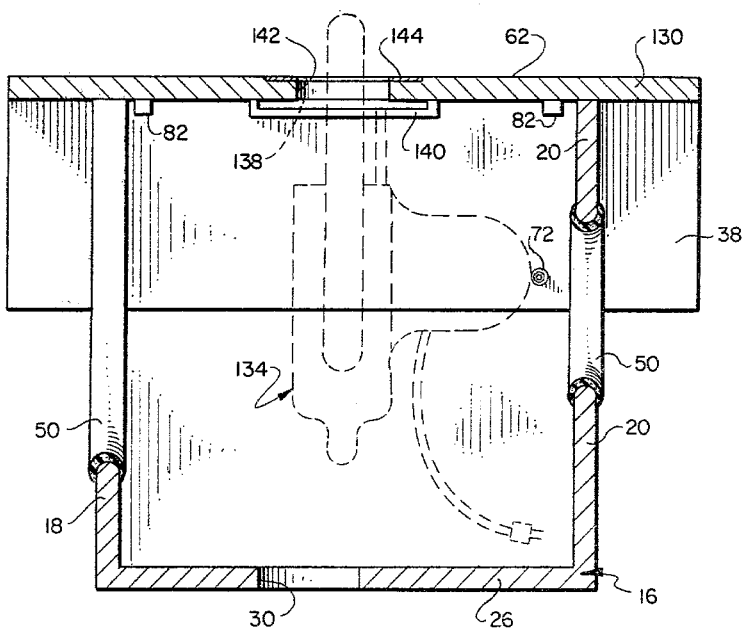
FIG. 4 is a lateral or transverse cross section through a second portable power receiving site along line 4—4 of FIG. 1.

The frame 12 also comprises a generally hollow rectangular elevated body, generally designated 16 which comprises spaced parallel elongated vertical walls 18 and 20 of sheet metal and substantially identical relatively short sheet metal end walls 22 and 24. Frame body 16 comprises a floor 26 contiguously engaging the lower interior surface of the walls 18, 20, 22 and 24 and being integrally secured thereto by welding or the like. The floor 26 of the frame body 16 comprises a pair of observation apertures 28 and 30. See FIGS. 3 and 4.

The vertical end edges of the sheet metal vertical walls 18, 20, 22 and 24 are contiguous and are secured integrally one to the next by welding or the like to define integral corners 32. Thus, the frame body 16 is generally rectangular in configuration and the interior thereof is a hollow sheel defined by vertical walls and a horizontal floor.

The elongated vertical walls 18 and 20 are identically centrally recessed at 34 for purposes hereinafter more fully explained. Each U-shaped recess 34 receives opposed spaced short vertical walls 36 and 38, respectively. Central walls 36 and 38 are integrally secured to the edge walls 18 and 20 at recess 34 as by welding or the like.

The frame body 16 also comprises a corner leg connector 40 at each corner 32. Each leg connector 40 comprises conventional hollow tubular stock having a relatively short axial length, cut transversely at the lower end and diagonally at the upper end. Each connector 40 comprises a hollow interior having dimensions substantially the same as the outside dimensions of the associated leg 14. Thus, each leg 14 fits snugly though reciprocably within the hollow interior of the associated leg connector 40. See FIG. 6.

Figure 6:
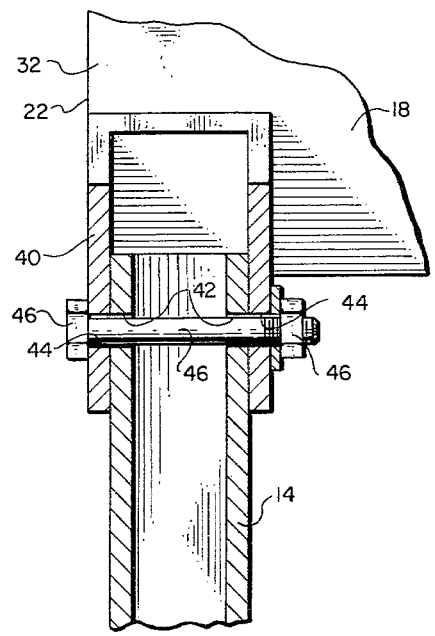
FIG. 6 is an enlarged fragmentary cross section illustrating the manner in which each floor engaging leg is connected to the frame body.

The upper end of each leg 14 comprises aligned apertures 42 in opposed sidewalls thereof. Likewise, correspondingly opposed sidewalls of each connector 40 comprises aligned aperture 44 having the same diameter as apertures 42. When each leg 14 is telescopically displaced into the associated connector 40, the apertures 42 and 44 are caused to become aligned with each other, following which a bolt assembly 46 with lock washer is installed, as best illustrated in FIG. 6. Accordingly, when it is desired to disassemble selected parts of the table 10 for transportation or storage purposes, the bolt assemblies 46 are removed. Each leg connector 40 is integrally secured to the adjacent vertical wall of the frame body 16, as by welding or the like.

The vertical walls 18, 20, 22 and 24 are illustrated as comprising relatively large access openings 50, which may be configurated as desired, each being illustrated as comprising elastomeric edging for safety purposes. Access openings 50 accommodate access by the user to power tools located at tool receiving sites interiorly disposed within the hollow of the frame body 16.

Each vertical wall 36 and 38 comprises two pairs of spaced lugs 54 each presenting aligned pin-receiving apertures to create a hinge as hereinafter more fully described. Each lug 54 is integral as by welding with the walls 36 and 38.

Table 10 comprises three horizontally disposed table areas 60, 62 and 64. Each table area 60, 62 and 64 comprises a power tool receiving site. Table area 64 comprises the top horizontally directed surface of a rectangular plate 66 which fills the base of the U-shaped recess 34 in both vertical walls 18 and 20 and has a width equal to the width of the plates 36 and 38. Horizontal platform 66 is secured in the illustrated and described position rigidly by welding or in any other suitable fashion. A pair of power tool stop plates 68 are provided substantially in the plane containing vertical wall 20 along one edge of the plate 66. Adjustable tool securing fasteners 70 are provided adjacent each stop 68 and are threadedly secured, respectively, to vertical plates 36 and 38 by threaded fasteners 72, which are illustrated as being in the form of bolts. The fasteners 70 are illustrated as being in the form of relatively small rectangular plates.

Accordingly, the horizontal base 74 of a miter saw 76 is fitted beneath each fastener 70 and against the stops 68 as illustrated in FIG. 2 thereby bringing the top workpiece receiving surface 78 of the miter saw 76 into a horizontal plane containing the table areas 60 and 62. With each adjustable connector 70 secured tightly by fastener 72, the miter saw 76 is firmly though removably held in the position illustrated in FIG. 2 and a workpiece may be placed so as to be contiguous and rest upon all three surfaces 60, 62 and 78 while the blade of the miter saw 76 is caused to cut or otherwise operate upon the workpiece, as is conventional. By merely loosening the fasteners 72, the miter saw 76 may be caused to slide across the surface 64 and be removed from the table 10 when it is desired to move the table from place to place or to disassemble the table for storage or for long range transportation.

Figure 5:
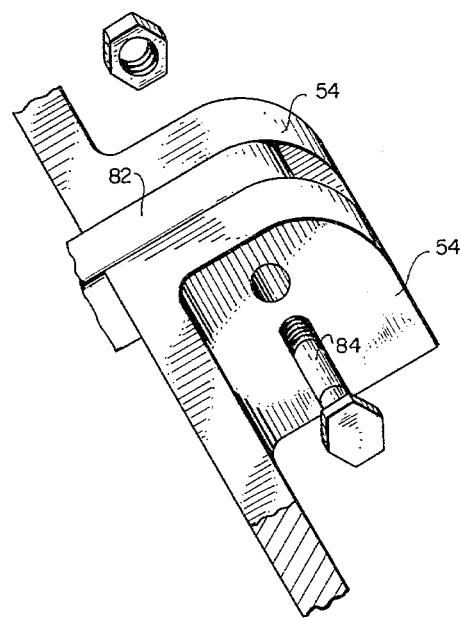
FIG. 5 is an enlarged fragmentary perspective of one of the hinges by which the horizontal plates are pivoted to provide access for placement and removal of portable power tools.

Table area 60 comprises the top horizontal surface of a plate 80, which is superimposed over and extends beyond the walls 18, 22 and 20, respectively. Plate 80 adjacent the recess 34 is integral as by welding, with spaced generally horizontally extending aperture lugs 82 which are sized, shaped and located so that a cantilevered end of each is disposed between each pair of lugs 54 carried by vertical wall 36. See FIGS. 1 and 5. Pins in the form of bolts 84 extend through aligned apertures in the associated lugs 54 and 82 to accommodate hinged rotation of the plate 80 between the illustrated horizontal position and an elevated position through on the order of 110 arcuate degrees thereby exposing a portable power tool receiving site 84 centrally disposed at the undersurface of the plate 80.

Plate 80 comprises a central circular opening 86 through which the cutting instrument 87 of a portable power router 88 or other power tool may be caused to project for cutting purposes as desired.

The base 90 of the tool 88 is caused to be held during use in a horizontal orientation at the tool receiving site 84 by L-shaped clamps 92 secured in the illustrated position by wing bolts 94, each of which is threadedly secured in an apertured block 96. Blocks 96 are integrally secured as illustrated to the plate 80 at the underside thereof by welding or the like. Thus, the router 88 may be placed at the site 84 or removed therefrom by tightening or loosening the wing bolts 94, respectively, and appropriate rotational displacement of the L-shaped clamps 92. Removal of the router 88 from the site 84 accommodates relocation of the table 10 from place to place at any given construction site or movement of the table 10 from one construction site to another construction site or for purposes of storage of the table 10.

The router 88 is installed and removed from its illustrated attachment site at the undersurface of the plate 80 by pivoting the plate upwardly through on the order of 110 degrees so that site 84 is readily visible and directly available to the user.

The edge 100 adjacent the vertical wall 22 is bevelled, as is the edge 102 of the plate 80, for the purpose of receiving the clamping ends of a fence, generally designated 104. Measurement scales 106 and 108 are received in recessed relation within the plate 80 so as to be flush with the horizontal table area or surface 60 and are used to correctly align the fence 104 between the edges 100 and 102.

Figure 7:
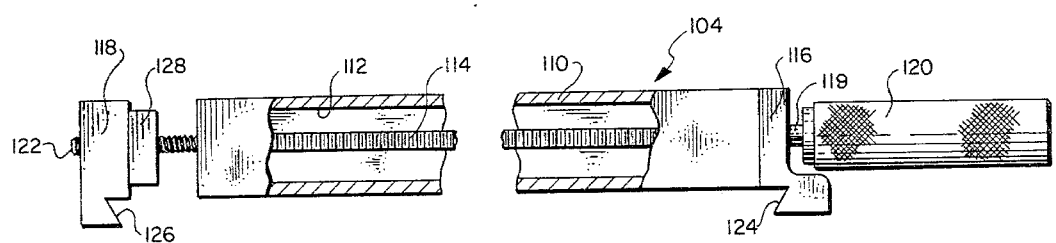
FIG. 7 illustrates in elevation, with parts broken away for clarity, the fence of FIG. 1.

The fence 104 comprises a hollow rectangular housing 110 comprising a hollow rectangular interior 112 defined by four housing walls. An elongated threaded shaft 114 is coaxial with the housing 110 and extends, at each end, beyond the housing. Threaded shaft 114 is threadedly secured in end blocks 118. The shaft 114 comprises a smooth proximal end 119 rotatably but not threadedly passing through the block 116 and non-rotatably anchored to the knurled handle 120. See FIG. 7. The distal end 122 threadedly passes through a central aperture in the end block 118. Accordingly, rotation of the handle 120 rotates the shaft 114 causing it to thread into or thread out of the block 118 to thereby change the effective length between the blocks 116 and 118. The block 118 comprises a reduced retangularly shaped portion 128 which is sized so as to fit snugly within the hollow interior 112 of the housing 110 when the block 118 is firmly against the distal end of the housing 110. Blocks 116 and 118 comprise opposed and aligned angular open grooves 124 and 126, respectively. Open grooves 124 and 126 are sized and shaped to matingly engage plate edges 100 and 102. By changing the effective distance between the blocks 116 and 118 as explained, the fence may be removed from or placed in aligned secure though removable fashion between the edges 100 and 102 whereby a workpiece may be slidably displaced along the fence 104 so that the cutting instrument of the router 88, for example, may operate appropriately upon the workpiece in a conventional fashion.

The table area 62 comprises the top horizontal surface of a plate 130 which is illustrated as being of sheet metal. Two lugs 82 extend from and are integral with the plate 130 along the edge 132. Each is sized, shaped and apertured to fit between spaced pairs of lugs 54 secured to the vertical plate 38 to form a hinge connection as heretofore explained and as illustrated best in FIG. 5. Therefore, the plate 30 may be pivoted about the two hinges comprising lugs 82 from the horizontal position illustrated in FIG. 1 through approximately 110 arcuate degrees to accommodate placement and removal of a portable power tool, such as power hand saw 134 at tool receiving site 136 at the underside of the plate 130.

This is accomplished so that the base 138 of the portable tool 130 is horizontally disposed contiguous with site 136 when the tool 134 is installed and ready for use. The tool base 138 is secured by one or more elongated fixed L-shaped fasteners 140 and preferably two of the previously described L-shaped clamps 92 secured by wing bolts 94 threadedly in blocks 96. Thus, by loosening the wing bolts 94 and rotating the L-shaped clamps 92, the base 138 of the saw 134 may be linearly inserted into and removed from fastener 140, as is illustrated.

When properly installed, the blade of the saw 134 will extend upwardly through a rectangular opening 142 which comprises a recessed liner 144, which is installed so as to be flush with surface 62.

Edge 132, adjacent wall 38 and distal edge 150 are each bevelled to accommodate proper placement of previously described fence 104 therebetween, for use in connection with the power saw 134. In this configuration, the installed portable power saw 134 functions as a table saw without the requirement of having a separate table saw per se on location.

A pair of fence aligning scales 152 and 154 are secured in recesses in the plate 130 so as to be flush with the surface 62.

Figure 8:
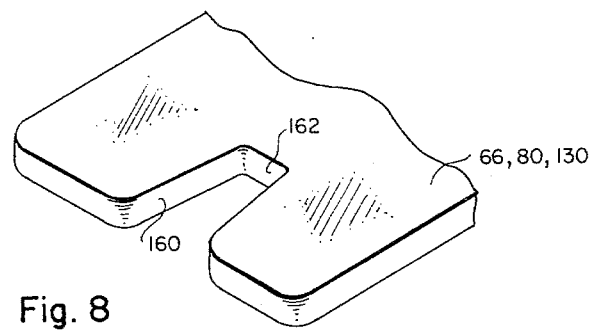
FIG. 8 is an enlarged fragmentary perspective of a platform area in accordance with the present invention having a door edge receiving notch.

With reference to FIG. 8, it is to be appreciated that any or all plates 66, 80 and 130 may include along one edge thereof a tapered recess 160. With recess 160 available, for example as part of plate 66, 80 and/or 130 (and fabricated of wood if desired), the table 10 may be located so that the edge of an installed door is fully inserted into and contiguous with the base 162 of the tapered recess 160. In this way, the door may be held in fixed vertical and swinging relationship as it is worked upon by a carpenter or the like for well known and conventional purposes.

Figure 9:
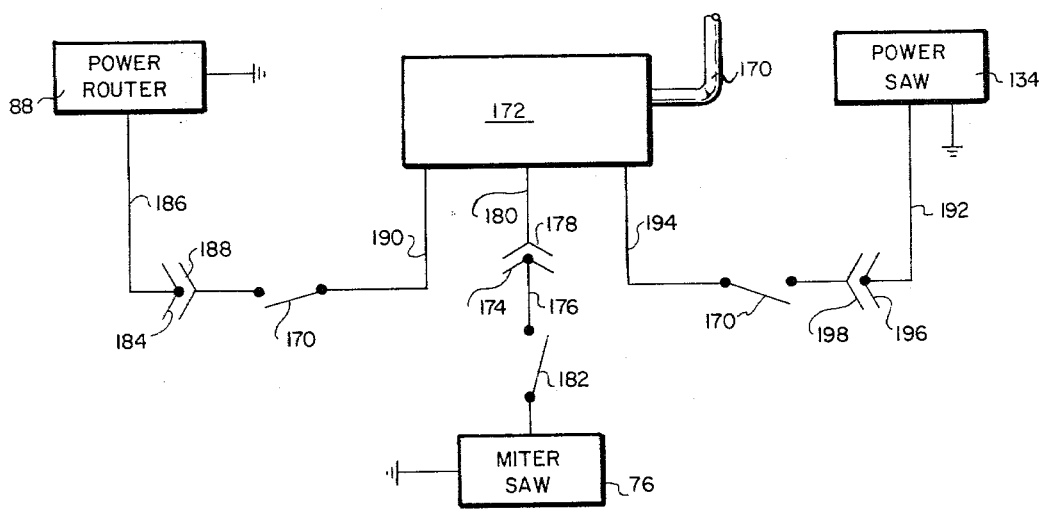
FIG. 9 is a schematic of the presently preferred electrical circuit for selectively delivering electrical power to any desired one of the three tool receiving sites of the table of FIG. 1.

With reference to FIG. 9, it is presently preferred that one or more switches 170 be provided along the exterior of the table 10 for ready access by the user. Suitable electrical power is delivered by a conventional cord 170 to a distribution box 172. When it is desired to deliver electrical power to the miter saw 76, the plug 174 at the end of the cord 176 of the radial saw 76 is electrically connected at female receptacle 178 whereby electrical power is communicated along line 180 to the miter saw 76 when the switch 182 of the miter saw is in its closed position. Typically, power is caused to be delivered by the operator only to one of the three power tools at any one point in time.

When it is desired to deliver power to router 88, the male plug 184 at the end of the router cord 186 is connected to the female electrical receptacle 188 of a conductor 190 serviced by the box 172. Electrical power is then delivered along conductor 190 to the router 88 when the associated switch 170 (at the outside of the frame body 16) is closed.

Likewise, when it is desired to deliver electrical power to the power saw 134, the power saw cord 192 is connected to a conductor 94 of the box 172 by insertion of saw plug 196 into female receptacle 198. Thus, when the associated switch 170 is closed, electrical power is delivered to the saw 134.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable multi-purpose construction table comprising:
frame means comprising substantially rigid body means and floor engaging leg means connected to and holding the body means at an elevation above the leg means;
platform means superimposed over at least part of the body means, the platform means comprising at least one tool receiving site and presenting a substantially horizontal exposed top surface the platform means further being U-shaped and also comprising a lower central horizontal exposed surface and two higher spaced outside horizontal surfaces, each outside horizontal exposed surface being disposed at the same elevation;

adjustable tool fastener means sized, shaped and located at the tool receiving site to removably secure the base of the tool in a substantially horizontal attitude at said site.

2. A portable multi-purpose construction table according to claim 1 wherein the tool receiving site is contiguous with the central exposed horizontal surface, and the two outside surfaces comprise supports across which a workpiece is intended to span, to accommodate operation of the tool upon the workpiece.

3. A portable multi-purpose construction table comprising:

frame means comprising substantially rigid body means and floor engaging leg means connected to and holding the body means at an elevation above the leg means;

first and second platform means vertically spaced from each other, each platform means being superimposed over at least part of the body means, each platform means comprising at least one power tool receiving site, the two platform means presenting vertical offset but adjacent substantially horizontal exposed top surfaces;

first and second adjustable tool attachment means carried by the respective platform means and sized, shaped and located at the two tool receiving sites to releasably secure the base of two different power tools in a substantially horizontal attitude one at each said site;

at least one of the two platform means comprise plate means hinge connected along one edge to the body means accommodating upward pivoting of the plate means to expose the underside of the plate means and wherein the associated tool receiving site and adjustable tool fastener means are carried at the underside of the plate means, the plate means comprising aperture means at said site through which workpiece engaging means of a portable power tool secured by said adjustable tool fastener means are adapted to extend.

4. A portable multi-purpose construction table comprising:

motorless frame means comprising substantially rigid body means and floor engaging leg means connected to and holding the body means above the leg means, the body means being vertically stepped so that a first part of the body means extend to a first elevation and a second part of the body means extend to a second, higher elevation;

the frame means further comprising first and second platform means vertically spaced from each other, one platform means being superimposed over the first part of the body means the other platform means being superimposed over the second part of the body means, each platform means comprising at least one power tool receiving site, the two platform means presenting vertical offset but adjacent substantially horizontal exposed top surfaces;

first and second adjustable tool attachment means carried by the respective platform means of the frame means and sized, shaped and located at the two tool receiving sites to releasably secure the base of two different hand power tools having independent motors in a substantially horizontal attitude one at each said site;

third platform means adjacent the lower one and spaced from the higher one of the other two platform means, the third platform means being at the same elevation as the higher of the two other two platform means, the third platform means comprising a third tool receiving site spaced from the two other tool receiving sites, two being disposed at the underside of two of the platform means and one at the top side of the remaining platform means.

5. A portable multi-purpose construction table comprising:

a frame comprising a substantially rigid generally hollow elevated body having a plurality of connected vertical walls, the frame also comprising floor engaging legs;

three power tool receiving site means carried by the frame body, one site means being centrally located at an exposed lower elevation and the other two site means being disposed above and on opposite sides of the central site means, each of the two last mentioned site means comprising plate means hinge connected to the body accommodating upward pivoting of the plate means to expose adjustable tool fastener means carried at the underside of the plate means, each plate means comprising at least one aperture through which workpiece cutting means of a portable power tool are adapted to extend;

electrical means comprising exposed switch means by which electrical power is caused to be delivered to any desired tool receiving site means.

* * * * *